Patented Oct. 14, 1924.

1,511,504

UNITED STATES PATENT OFFICE.

CHARLES G. CARLSTRUM, OF LAKEWOOD, OHIO.

REFRACTORY MORTAR AND CEMENT COMPOSITION.

No Drawing.     Application filed January 31, 1923. Serial No. 616,211.

*To all whom it may concern:*

Be it known that I, CHARLES G. CARLSTRUM, a citizen of the United States, residing at Lakewood, in the county of Cuyahoga and State of Ohio, have invented a new and useful Composition of Matter to be Used in the Making of Refractory Mortar and Cement Composition, of which the following is a specification.

My composition consists of the following ingredients, combined in the proportions stated, viz:

| | | |
|---|---|---|
| Fire clay | 20% | of the total mass or under. |
| Salt | 2% | of the total mass or under. |
| Coal ash | 78% | of the total mass or over. |
| | 100% | |

These refractory ingredients, combined as indicated when mixed with sufficient water to make same into a mortar, cement or plaster, for the kind of service intended, is to be used for the laying up of the bricks in the linings of furnaces or for the surfaces of any high temperature interior, such as made for steam boilers, blast furnaces, checker-work, melting furnaces, cupolas and the like, ladles used for carrying melted metals and the like and in similar instances, as a plaster to cover the surfaces for protecting same from the heat.

These refractory ingredients, are to be thoroughly mixed either by hand labor or by mixing machinery.

These refractory ingredients, are to be ground to a fine powder either together or separate from each other, when ground together, the mixing in the approximate indicated proportions, is accomplished before introduction into the grinding machinery and when ground separately, the mixing in the proportions, is to be done after coming from the grinding machinery and when so mixed and ground or so ground and mixed, the composition is then completed and is ready for disposal to the user.

When the above-named composition has reached a user and is to be made into a mortar for the purpose of application in between bricks or tiles to form a lining of a high temperature interior or when it is to be made into a plaster for the purpose of protecting such surfaces from the heat; water is to be added in the proportions necessary for the service required, more being added when used as a plaster than when used as a mortar; for whatever purpose it is to be used, all that is required to bring the composition into serviceable conditions, is, that the experienced judgment of a user is to be relied upon for the proper quantity of water that is to be added, the water acts only as a carrier as is customary in some other mortars, just for the purpose of getting the composition into the places or position desired; after which the heat having dried the water out, sets the composition into a hard and very refractory condition.

These refractory ingredients combined and applied as described, join with and strongly adhere to such surfaces as indicated, in the presence of heat, and it will therefore obviously be seen that there are other uses for the composition, such as to thoroughly incorporate same with cinders, crushed refractory stones and crushed burned fire bricks, as a cement, whereupon the whole when in place and subjected to high temperature, completely set into one solid mass, in a manner similar to what transpires when Portland cement is used to make concrete.

It is not intended to confine the invention to the exact proportions here described as changes will give compositions that will produce substantially similar results but I prefer the proportions as stated.

I am aware that compositions consisting of cinders, coal ashes, lime and hydraulic cement, sand, gypsum and similar solids have been mixed with compounds containing protoxide of lead, sulphate of zinc, alum and silicate of soda, for the purpose of making artificial marble or stones; but I am not aware that the composition described has ever been composed and used thereafter for the making of a mortar or cement to lay up or build a furnace lining or the lining of any interior designed to contain and resist high temperatures, in the manner and for the purpose herein set forth.

I am not aware that the ingredients specified, in the proportions indicated, or in any other proportions, or at all, have ever been assembled, to be thereafter used for the making of a mortar or cement, prior to my invention thereof.

I claim:

The herein-described composition of refractory materials, for the making of refractory mortars, cements or plasters, consisting of fire clay not more than twenty per cent of the total mass, salt not more than two per cent of the total mass, coal ash not less than sixty-eight per cent of the total mass and ganister rock not more than ten per cent of the total mass, substantially as described.

CHARLES G. CARLSTRUM.

Witnesses:
R. G. DUBIN,
M. L. CARLSTRUM.